(12) United States Patent
Jankovic et al.

(10) Patent No.: US 9,298,204 B2
(45) Date of Patent: Mar. 29, 2016

(54) AC TO AC CONVERTER AND METHOD OF OPERATION THEREOF FOR SOFT STARTING MOTORS AND OTHER APPLICATIONS

(71) Applicant: Eaton Corporation, Cleveland, OH (US)

(72) Inventors: Zeljko Radomir Jankovic, Milwaukee, WI (US); Vijay Bhavaraju, Germantown, WI (US); Bruno Patrice-Bernard Lequesne, Menomonee Falls, WI (US); Yakov Lvovich Familiant, Brown Deer, WI (US)

(73) Assignee: Eaton Corporation, Cleveland, OH (US)

( * ) Notice: Subject to any disclaimer, the term of this patent is extended or adjusted under 35 U.S.C. 154(b) by 482 days.

(21) Appl. No.: 13/727,886

(22) Filed: Dec. 27, 2012

(65) Prior Publication Data

US 2014/0184190 A1    Jul. 3, 2014

(51) Int. Cl.
*H02M 5/293* (2006.01)
*G05F 3/04* (2006.01)
(Continued)

(52) U.S. Cl.
CPC .. *G05F 3/04* (2013.01); *H02P 1/28* (2013.01); *H02P 1/42* (2013.01); *H02M 2001/0009* (2013.01); *H02M 2005/2932* (2013.01)

(58) Field of Classification Search
CPC ....... H02M 5/275; H02M 5/297; H02M 1/36; H02M 2005/2932; H02P 1/00; H02P 1/05; H02P 1/26; H02P 2205/01
See application file for complete search history.

(56) References Cited

U.S. PATENT DOCUMENTS

| 6,459,606 | B1 | 10/2002 | Jadric |
| 7,034,499 | B2 | 4/2006 | Kerlin, IV et al. |

(Continued)

FOREIGN PATENT DOCUMENTS

| CN | 102291005 A | 12/2011 |
| DE | 102008029898 A1 | 4/2009 |

OTHER PUBLICATIONS

Ziogas et al., "A Practical PWM AC Controller Topology," Proceedings of the Industry Applications Society Annual Meeting, Houston, Oct. 4-9, 1992; New York, IEEE, US, vol. 1, Oct. 9, 1992, pp. 880-887.

(Continued)

*Primary Examiner* — Harry Behm
*Assistant Examiner* — Peter Novak
(74) *Attorney, Agent, or Firm* — Ziolkowski Patent Solutions Group, SC

(57) ABSTRACT

A load control device includes an input and an output connectable to an AC source and an AC load, respectively, with one or more supply lines each corresponding to a phase in the load connecting the input and output. Line-side switches are connected between a line terminal and load terminal, and floating-neutral side switches are connected to the load terminal at one end and at a common neutral connection at another end. A controller determines a direction of current flow on each of the supply lines, determines a switching pattern for each of the line-side switches and each of the floating-neutral side switches based on the determined direction of current flow, and causes each of the line-side switches and floating-neutral side switches to operate in an On condition or an Off condition according to the determined switching pattern, such that a controlled uninterrupted current is provided to the AC load.

19 Claims, 6 Drawing Sheets

(51) Int. Cl.
*H02P 1/28* (2006.01)
*H02P 1/42* (2006.01)
*H02M 1/00* (2007.01)

(56) References Cited

U.S. PATENT DOCUMENTS 7,345,449 B2    3/2008  Barie et al.
7,729,139 B2 *  6/2010  Chan .................. H02M 1/32
                                                363/40

OTHER PUBLICATIONS

Min et al., "Novel PWM line conditioner with fast output voltage control," IEE Proceedings: Electric Power Applications, Institution of Electrical Engineers, GB, vol. 145, No. 2, Mar. 10, 1998, pp. 85-91.

Kwon et al., "Novel Topologies of AC choppers," IEE Proceedings: Electric Power Applications, Institution of Electrical Engineers, GB, vol. 143, No. 4, Jul. 10, 1996, pp. 323-330.

International Search Report and Written Opinion from corresponding PCT/US2013/077381, dated Mar. 24, 2014.

Saracoglu et al., "A Novel Technique for Optimal Efficiency Control of Induction Motor Fed by PWM IGBT AC Chopper," 2004 35th Annual IEEE Power Electronics Specialists Conference, Aachen, Germany, pp. 3353-3358.

Guangqiang et al., "A Novel Induction Motor Soft Starter With Torque Pulsations Elimination Capability," 2005 IEEE IECON Conference, pp. 1695-1700.

Borowy et al., "Soft-Switched MCT/IGBZT Inverter for Motor Drive Applications," IEEE, Power Electronics in Transportation, 1998, pp. 53-62.

Kim et al., "A New Cost Effective SRM Drive using Commercial 6-Switch IGBT Modules," 37th IEEE Power Electronics Specialists Conference 2006, Jun. 18, 2006-Jun. 22, 2006, pp. 1-7.

* cited by examiner

| CASE | SUB-CASE | Ia | Ib | Ic | IGBT 22 | IGBT 24 | IGBT 26 | IGBT 28 | IGBT 30 | IGBT 32 | Va, Vb, Vc (V ACROSS MACHINE TERMINALS) |
|---|---|---|---|---|---|---|---|---|---|---|---|
| U | U1 | POSITIVE + | NEGATIVE − | NEGATIVE − | ON | OFF | OFF | OFF | OFF | OFF | LINE VOLTAGE |
|   | U2 | POSITIVE + | NEGATIVE − | NEGATIVE − | OFF | OFF | OFF | OFF | ON | ON | 0 |
| V | V1 | POSITIVE + | POSITIVE + | NEGATIVE − | ON | ON | OFF | OFF | OFF | OFF | LINE VOLTAGE |
|   | V2 | POSITIVE + | POSITIVE + | NEGATIVE − | OFF | OFF | OFF | OFF | OFF | ON | 0 |
| W | W1 | NEGATIVE − | POSITIVE + | NEGATIVE − | OFF | ON | OFF | OFF | OFF | OFF | LINE VOLTAGE |
|   | W2 | NEGATIVE − | POSITIVE + | NEGATIVE − | OFF | ON | ON | OFF | OFF | OFF | 0 |
| U' | U'1 | NEGATIVE − | POSITIVE + | POSITIVE + | OFF | OFF | ON | OFF | OFF | OFF | LINE VOLTAGE |
|   | U'2 | NEGATIVE − | POSITIVE + | POSITIVE + | OFF | OFF | ON | ON | OFF | OFF | 0 |
| V' | V'1 | NEGATIVE − | NEGATIVE − | POSITIVE + | OFF | OFF | ON | ON | OFF | OFF | LINE VOLTAGE |
|   | V'2 | NEGATIVE − | NEGATIVE − | POSITIVE + | OFF | OFF | OFF | ON | ON | OFF | 0 |
| W' | W'1 | POSITIVE + | NEGATIVE − | POSITIVE + | ON | OFF | OFF | ON | OFF | OFF | LINE VOLTAGE |
|   | W'2 | POSITIVE + | NEGATIVE − | POSITIVE + | OFF | OFF | OFF | OFF | ON | OFF | 0 |

FIG. 2

AC TO AC CONVERTER AND METHOD OF OPERATION THEREOF FOR SOFT STARTING MOTORS AND OTHER APPLICATIONS

BACKGROUND OF THE INVENTION

The present invention relates generally to AC-to-AC electronic converters and, more particularly, to an AC-to-AC converter and method of operation thereof that provides for soft starting of AC loads, (e.g., AC motors), and other related operations including managing 3-phase AC loads.

AC-AC converters function to convert an AC voltage to another AC voltage. One type of AC-AC converters commonly used in industry are soft starters, which are industrial control devices that make it possible to start AC induction motors smoothly, with a reduced inrush current. Soft starters typically employ silicon controlled rectifiers (SCRs) for reducing voltage applied to the motor and thus reducing the starting inrush current to the motor. While SCRs can be turned on at will, they cannot be turned off in a dynamic and controllable fashion, as SCRs turn off naturally when the current reaches zero. SCRs thus lack the desired capability to provide precise control over current—with more control over the current being desirable in order to reduce harmonics, reduce heat dissipation, and further improve AC motor starting, restarting, and stopping characteristics.

Other devices are available that make dynamic and controllable current interruption possible, such as insulated gate bipolar transistors (IGBTs) for example. IGBTs have been used to start motors in various ways, such as by first rectifying an incoming AC voltage, smoothing the DC voltage with a capacitor, and then inverting it with six IGBTs (three-phase full-bridge DC-to-AC inverter). However, such use of IGBTs is often restricted to complex "motor drives," and while the use of IGBTs in motor drives works very well, the motor drives that incorporate the IGBTs are typically significantly more expensive than a soft starter. While certain elements in the motor drive can be avoided/eliminated in an attempt to reduce cost, such as avoiding usage of a DC link by using a matrix configuration, such converters use many more devices and are also costly.

Another type of circuit that has been used for providing controllable current interruption is called an "AC chopper." In an AC chopper, IGBTs are switched on and off at a given, typically high, frequency (kHz or more). The switching is, to a large extent, divorced from the incoming voltage, in terms of timing and phasing. This necessitates the use of capacitors in the AC chopper, in order to provide a path for the energy in the machine inductance when the IGBTs are turned off, as the energy left in the inductance at turn off time can create large voltage spikes, proportional to L*di/dt. These capacitors need to be large, typically commensurate with the machine inductance. As such, in the end, AC choppers require large passive elements such as capacitors, thus incurring a high cost.

It would therefore be desirable to provide a system and method of operation thereof that can start, operate, and stop (brake) AC loads, and particularly electric AC motors, smoothly, conveniently, and with more control than a conventional, SCR-based soft starter, yet is less costly than a drive, a matrix converter, or an AC chopper.

DESCRIPTION OF THE INVENTION

The present invention provides a system and method for providing an uninterrupted current to an AC load, such as an AC induction motor. A control device is provided that includes a plurality of switches therein having a simple soft-starter type topology/arrangement, with the switches limiting the transient voltages and current to the AC load during start-up. A controller in the load control device implements a control scheme for controlling the switches such that the current in the AC load is never discontinuous.

In accordance with one aspect of the invention, a load control device to control current flow to an AC load includes a circuit having an input connectable to a line terminal of an AC source, an output connectable to a load terminal of an AC load, one or more supply lines connecting the input and output to transmit power from the AC source to the AC load with each supply line corresponding to a phase in the AC load, a plurality of line-side switches connected between the line terminal and the load terminal with each supply line including at least one line-side switch connected thereto, and a plurality of floating-neutral side switches connected to the load terminal at one end and together at a common connection at another end with each supply line including at least one floating-neutral side switch connected thereto. The load control device also includes a controller connected to the circuit and configured to determine a direction of current flow on each of the supply lines, determine a switching pattern for each of the plurality of line-side switches and each of the plurality of floating-neutral side switches based on the determined direction of current flow on each of the supply lines, and cause each of the plurality of line-side switches and each of the plurality of floating-neutral side switches to operate in either an On condition or an Off condition according to the determined switching pattern, such that a controlled uninterrupted current flow is provided to the AC load.

In accordance with another aspect of the invention, a control device for controlling application of voltage and supply of current from an AC power source to an AC load includes one or more supply lines connecting line terminals of the AC power source to load terminals of the AC load, with each supply line corresponding to a phase in the AC load. The control device also includes a plurality of switches selectively switchable between an On condition and an Off condition to control transmission of voltage and current from an AC power source to an AC load, with the plurality of switches further including a group of line-side switches connected to the supply lines between the line terminals and the load terminals such that each supply line includes at least one line-side switch connected thereto and a group of floating-neutral side switches connected to the supply lines at one end and together at a common connection at another end such that each supply line includes at least one floating-neutral side switch connected thereto. The switches have unidirectional control with a diode for flow of current in the reverse direction. The current flows though the diodes of the switches when the voltage of the motor terminal is higher than the voltage on the line side, which occurs when the switch is in the Off condition. The control device further includes a processor programmed to identify a current on each of the supply lines as a positive current or negative current, determine a switching pattern for each of the line-side switches and each of the floating-neutral side switches based on the identified positive and negative currents, and selectively operate each of the line-side switches and each of the floating-neutral side switches in the On condition or the Off condition according to the determined switching pattern, wherein switching the plurality of switches according to the determined switching pattern provides for an uninterrupted current flow between the switches and the diodes to the AC load during switching of the plurality of switches.

In accordance with yet another aspect of the invention, a method for controlling current flow to an AC load includes the step of providing a circuit in series between an AC power source and an AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end. The method also includes the step of selectively operating the circuit in an active mode and a free-wheeling mode so as to selectively provide a full phase voltage to the load terminals during the active mode and a zero voltage to the load terminals during the free-wheeling mode of operation, wherein the step of operating the circuit further comprises identifying a current on each of the one or more supply lines as a positive current or negative current, determining a switching pattern with a defined frequency and a duty cycle for each of the line-side switches and each of the floating-neutral side switches based on the identified positive and negative currents, and selectively operating each of the plurality of line-side switches and each of the plurality of floating-neutral side switches in the On condition or the Off condition according to the determined switching pattern, wherein switching the plurality of switches according to the determined switching pattern provides for a continuous current flow to the AC load during switching of the plurality of switches.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIG. 2 is a table illustrating a switching logic for switching IGBTs in the load control device in FIG. 1, according to an embodiment of the invention.

DETAILED DESCRIPTION OF THE PREFERRED EMBODIMENTS

The embodiments of the invention set forth herein relate to a system and method for providing a controlled uninterrupted current to a load, such as an AC induction motor. A motor control device is provided that includes a plurality of switches therein that limit the transient voltages and current to the AC load during start-up, with a controller in the motor control device implementing a control scheme for controlling the switches such that the current in the AC load is continuous.

Figure 1:
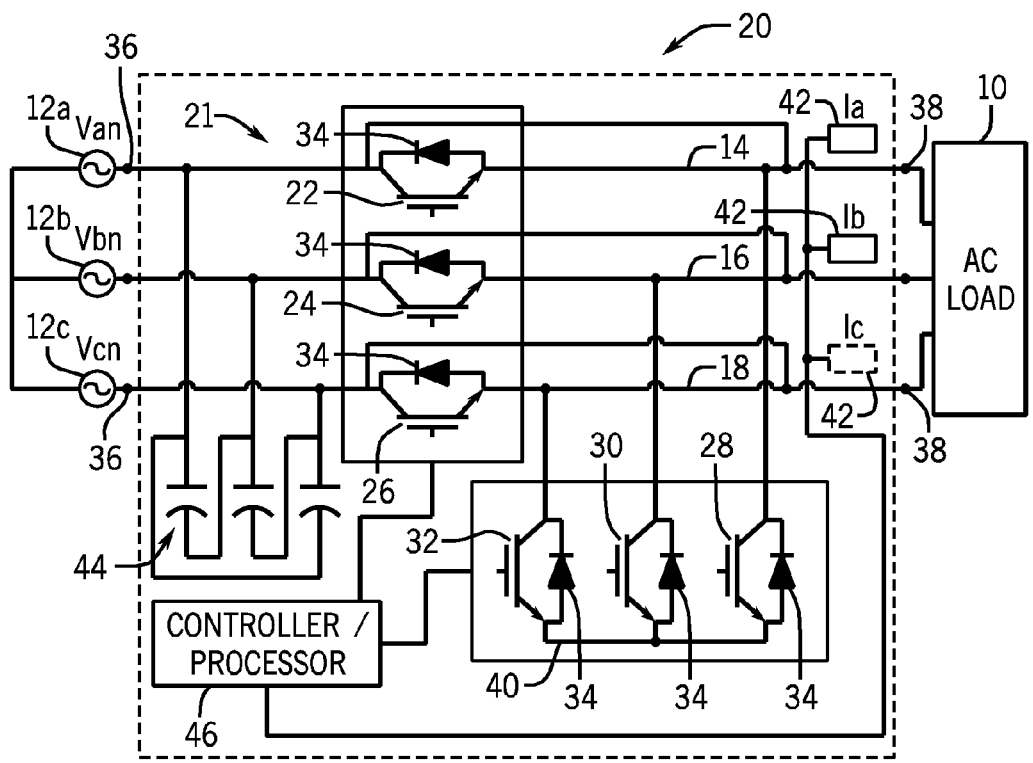
FIG. 1 is a schematic view of an AC load or motor control device for controlling 3-phase AC currents to an AC load in a controlled fashion, according to an embodiment of the invention.

Referring to FIG. 1, a three-phase, AC load 10 is shown for use with embodiments of the invention. According to one embodiment, the AC load 10 includes one or more induction motors where power is supplied from the stator to the rotor (not shown) thereof by means of electromagnetic induction, with the AC load 10 being operatively connected to a three-phase AC source 12a-12c through corresponding supply lines 14, 16 and 18, respectively, so as to receive power therefrom. Thus, for purposes of reference, supply line 14 corresponds to a Phase A, supply line 16 corresponds to a Phase B, and supply line 18 corresponds to a Phase C. As shown in FIG. 1, a motor control device 20 is connected between AC source 12a-12c and AC load 10 that performs an AC-AC conversion of the AC waveform generated by AC source 12a-12c to another AC waveform for input to the AC load 10. In an exemplary embodiment of the invention, motor control device 20 comprises a soft-starter configured to limit the inrush current to AC load 10 during start-up, resulting in a "soft" motor start that avoids inrush currents, and thus the motor control device is hereafter referred to as a soft-starter. It is recognized, however, that embodiments of the invention are not limited to soft-starter topologies and may be incorporated into other motor control devices such as AC motor drives and other related devices. Generally speaking, control device 20 uses a 3-phase AC supply voltage as input and provides a controlled AC voltage or current to the load.

The basic structure of soft-starter 20 is shown in FIG. 1 (i.e., circuitry 21 of the soft-starter) as including a plurality of switches 22, 24, 26, 28, 30, 32 connected to supply lines 14, 16, 18, with each of the switches having a unidirectional control and being coupled in anti-parallel with a diode 34 for flow of current in the reverse direction, so as to control the current flow and, in turn, the terminal voltages of the AC load 10. According to an exemplary embodiment of the invention, the switches are in the form of IGBTs, and thus the switches are hereafter referred to generally as IGBTs. However, it is noted that "IGBT" should be understood as any switch that can be turned on and off at will (at any frequency including high frequencies in the tens of kHz and beyond), IGBTs being currently a common technology in many induction motor drive applications. Other kinds of electronic switches, such as MOSFETs or MCTs (MOS-Controlled Thyristors) for instance, can be used depending on voltage level, power level, and other considerations.

According to an exemplary embodiment of the invention, an arrangement of six IGBTs 22, 24, 26, 28, 30, 32 is provided in the soft-starter. Three IGBTs 22, 24, 26 are connected between the line terminals 36 of AC source 12a-12c and the load terminals 38 of AC load 10, and thus are herein referred to as "line-side IGBTs". Three other IGBTs 28, 30, 32 that are referred to herein as "floating-neutral side IGBTs" are connected to the load terminals 38 at one end and together at a common connection 40 at the other end. This common connection 40 forms what is referred to herein as a "floating neutral point," with the qualifier "floating" being used to distinguish this point from the load neutral or source neutral, to which it is not connected. As shown in FIG. 1, six IGBTs are provided corresponding to the number of phases (i.e., three phases), with one "line-side IGBT" and one "floating-neutral side IGBT" per phase. It is recognized, however, that any number of phases can be envisioned and thus embodiments of the invention can be readily extended from a 3-phase example, with two IGBTs per phase in general, with special consideration for the case of a single-phase system which requires two "line-side IGBTs" (one each for the line and return) and similarly two "floating-neutral side IGBTs," as will be discussed in greater detail later on.

According to one embodiment of the invention, a means to sense the current in at least two of the load terminals 38 is included in soft-starter 20, such as sensors 42 positioned on two or more of supply lines 14, 16, 18. Sensors 42 could also be configured to sense voltage on supply lines 14, 16, 18. Additionally, according to one embodiment of the invention, capacitors 44 are positioned between the line terminals 36 and the line-side IGBTs 22, 24, 26 to provided buffering. While such capacitors 44 may be included in soft-starter 20, it is recognized that the capacitors are small in size/capacity, as the controlling of the IGBTs 22, 24, 26, 28, 30, 32 according to a desired control scheme (as will be explained in detail below) provides for a controlled uninterrupted load current to AC load 10 so as to obviate the need for larger capacitors and/or capacitors all together.

Also included in soft-starter 20 is a controller or processor 46 configured to switching of IGBTs 22, 24, 26, 28, 30, 32 via gate drive signals thereto. During starting (or stopping/braking) of AC load 10, controller 46 functions to selectively cause each of IGBTs to operate in an On or Off condition, so as to control the current flow (and therefore the voltage) applied to the AC load 10. According to embodiments of the invention, controller 46 is configured and programmed to implement a switching pattern control scheme that provides for full control of the currents provided to load terminals 38 on supply lines 14, 16, 18, while providing for the current in the load inductances to never be interrupted.

In implementing a switching control scheme or pattern for the IGBTs 22, 24, 26, 28, 30, 32, the controller 46 first implements an initial routine at start-up of AC load 10. According to one embodiment of this initial routine, at onset, all of the line-side IGBTs 22, 24, 26, are pulsed together. The current then flows according to relative phase voltage magnitudes at that instant in time, with a direction of the current flow being measured/detected by the current sensors 42. According to another embodiment of the invention, rather than measuring the actual current flow by way of current sensors 42, the line voltages are instead measured, with a determination being made from such measurement of which of IGBTs 22, 24, 26, 28, 30, 32 should be turned on.

Subsequent to performing of the initial routine, the controller 46 controls a switching of the IGBTs 22, 24, 26, 28, 30, 32 to the On and Off conditions based on a sensed direction of current flow (positive or negative) on each of the supply lines 14, 16, 18. More specifically, in whichever one phase (or two phases) the current is positive, either the corresponding line side IGBT(s) 22, 24, 26, are turned on and all other IGBTs are turned off or, alternatively, the floating-neutral side IGBTs 28, 30, 32 in the other two (or one) phases are turned on and all other IGBTs are turned off. In controlling the IGBTs to operate in the On and Off states in such a manner via controller 46, current is caused to always flows through the AC load 10.

The switching logic described above is summarized in FIG. 2, in that the switching of IGBTs 22, 24, 26, 28, 30, 32 is primarily governed by the sign of the current of each phase at any given time. Referring to FIG. 2, and with continued referenced to FIG. 1, "positive" current should be understood as "greater than zero", or "greater than a small positive number," and similarly for "negative" current. This is for cleaner implementation in the presence of noise, and to avoid control confusion when the current signal is exactly zero. As a result of controller 46 implementing the switching logic illustrated in FIG. 2, the load terminals 38 will see either full phase voltage as provided by the source ($V_a=V_{an}$, $V_b=V_{bn}$, and $V_c=V_{cn}$) or zero voltage in all three phases ($V_a=V_b=V_c=0$). The first instance is referred to as an "active period" while the latter is referred to as a "free-wheeling period." The "active" mode/period refers to energy transfer from the source to the load (as in a motoring mode for a machine), or from the load to the source (as in a generating, regenerating, or braking mode for a motor or a generator), as opposed to the "free-wheeling" mode/period where any energy transfer is generally confined to the load (losses in the drive and wiring notwithstanding.

In order to provide a better understanding of the switching logic applied by controller 46 for controlling operation of IGBTs 22, 24, 26, 28, 30, 32, several examples are set forth herebelow.

Example 1

In a first example, as a result of the initial routine, it is determined that Current $I_a$ is positive while both $I_b$ and $I_c$ are negative (Case U). Then, IGBT 22 (i.e., the line-side IGBT in Phase A) is left on and all other IGBTs 24, 26, 28, 30, 32 are turned off or left off. Full line voltage is then applied to the load terminals 38 during an active period. This is Sub-Case U1 in FIG. 2. At any time (i.e., "control time") during this Case U, the voltage at the load terminals 38 can be switched from line voltage to zero by turning off IGBT 22 and turning on IGBTs 30, 32 (Sub-Case U2), so as to transition to a free-wheeling period. IGBTs 30, 32 are the two floating-neutral side IGBTs that are not in Phase A. The "control time", therefore, divides Case U into two periods, first an active period, second a free-wheeling period. The ratio of the active period over the sum of the active period and the free-wheeling period is referred to as the duty cycle, and is a key element in controlling the average voltage supplied to the AC load 10.

Thus, during the active period, current flows through the AC load 10 from the source 12a-12c (Phase A voltage $V_{an}$), and then back to the source 12a-12c via the diodes 34 in anti-parallel with IGBTs 24, 26. During the free-wheeling period, the current continues, uninterrupted, through the diode 34 in anti-parallel with IGBT 28 and then through IGBTs 30, 32.

It can be appreciated that as long as the current $I_a$ is positive and the currents $I_b$ and $I_c$ negative (i.e., Case U), one can switch back and forth from Sub-Case U1 to Sub-Case U2, back to Sub-Case U1, then Sub-Case U2, etc. How often this switching of the IGBTs 22, 24, 26, 28, 30, 32 occurs is recognized as the system switching frequency and how long the switches are in each cycle is expressed as a duty cycle. This switching frequency is preferably a multiple of the number of phases (usually 3) and the supply frequency (usually 60 Hz or 50 Hz), as other frequencies generate a DC component of current and are generally undesirable. For example, the switching frequency may be a multiple of 180 Hz (or a multiple of three times 60 Hz, assuming 60 Hz is the line frequency). In general, the higher the frequency, the smaller the harmonic content, and the higher the switching losses. It is recognized that other switching frequencies are possible; however, as the resulting currents would have a DC component, such frequencies would be used only if such a DC component were desirable.

Example 2

In a second example, two of the currents are positive, such as $I_a$ and $I_b$, while the third one ($I_c$) is negative. This is Case V in FIG. 2. In such a case, the line-side IGBTs 22, 24 in those two phases will be in the On condition during an "active period" while all other IGBTs 26, 28, 30, 32 are off (see Sub-Case V1). A "free-wheeling period" can be similarly obtained by turning off these two switches IGBTs 22, 24, and turning on IGBT 32 in the third phase (Sub-Case V2).

The same logic applies in the cases labeled W, or U', V', and W' in FIG. 2. In particular, Cases U', V', and W' are mirror images of Cases U, V, W, with whichever current is positive in Case U, V, or W, being negative in Cases U', V', and W', and vice-versa.

Figure 3:
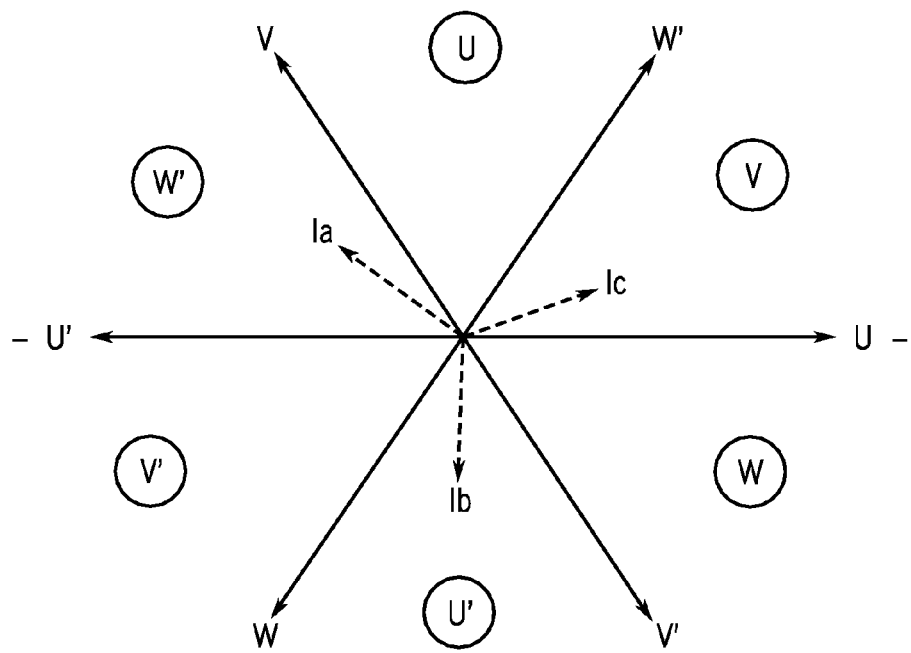
FIG. 3 is a vector diagram with sectors that illustrates the switching logic of FIG. 2 as vector controls.

Referring now to FIG. 3, and with reference still to FIG. 2, the cases U, V, W, U', V', and W' are illustrated with respect to a vector control diagram of the motor drive 20 that controls the three-phase output thereof. The cases U, V, W, U', V', and W' are shown in corresponding sectors of the vector diagram in FIG. 3, with the currents $I_a$, $I_b$, $I_c$ also being illustrated.

In summary, the switching logic and pattern for switching IGBTs 22, 24, 26, 28, 30, 32 implemented by controller 46 is governed by the sign of the currents in Phases A, B, and C. Within each current pattern, the voltage applied to the AC load 10 is either full line voltage (i.e., active period), or zero (i.e., free-wheeling period), as controlled by the duty cycle of the switching of the IGBTs 22, 24, 26, 28, 30, 32. The overall frequency at which the IGBTs 22, 24, 26, 28, 30, 32 are turned on and off is an additional degree of freedom which can be put to advantage to reduce harmonics among other things.

Figure 4:
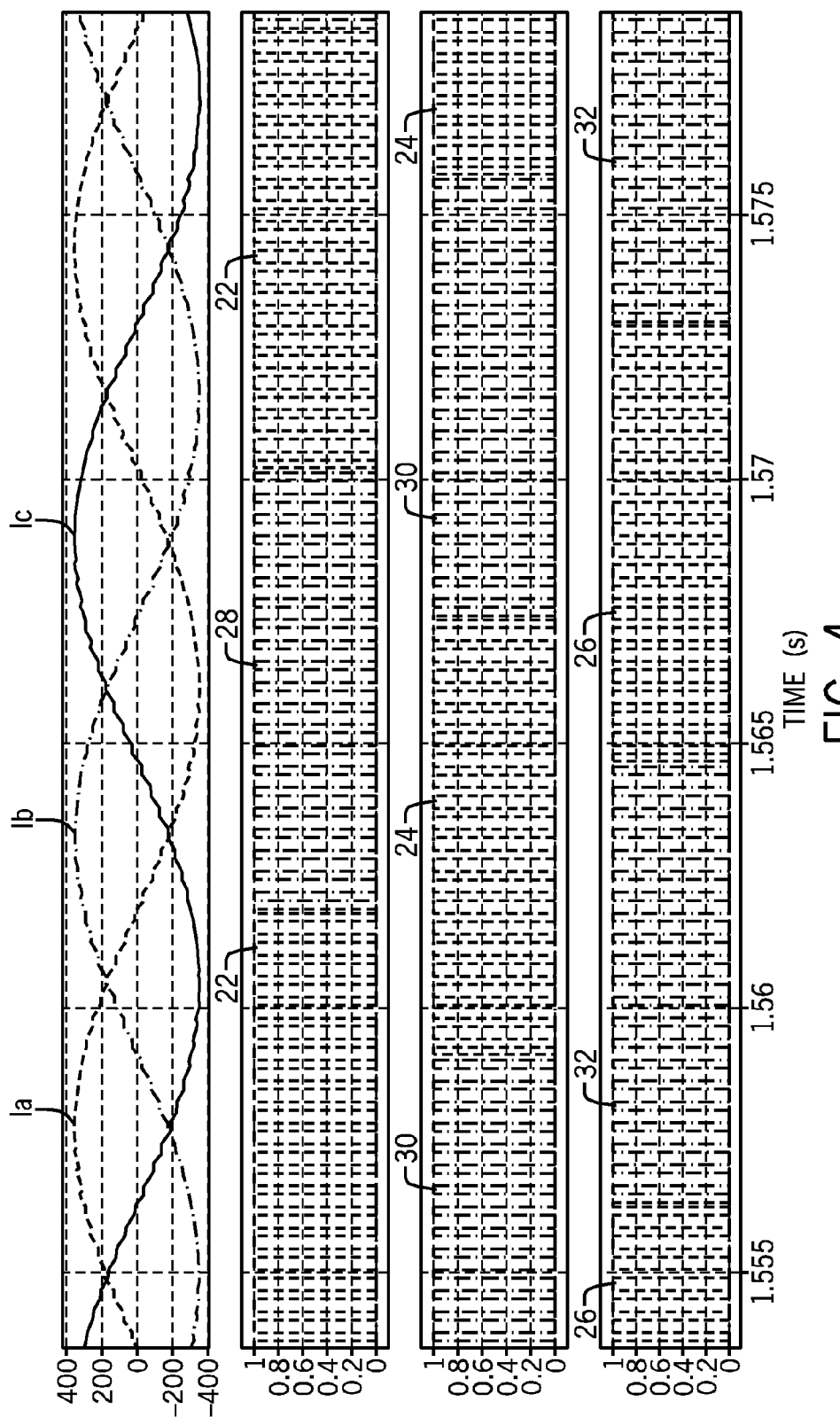
FIG. 4 is a diagram illustrating the output currents of the controller (i.e., load/motor currents) and the gating signals to the IGBTs in the motor control device in FIG. 1, according to an embodiment of the invention.

For purposes of further illustrating embodiments of the invention, FIG. 4 illustrates the output currents of the controller 46 (i.e., motor currents) and the gating signals provided from the controller to the IGBTs to control the switching thereof, with the motor currents being controlled by controlling the duty cycle of the pulses. As shown in FIG. 4, with respect to Phase A, gating signals from the controller cause the corresponding line side IGBT 22 to be on while the current $I_a$ in that phase is positive (i.e., during the active periods), and to be off while $I_a$ is negative (i.e., during the free-wheeling periods). When $I_a$ is negative (i.e., during the free-wheeling periods), gating signals from the controller cause IGBT 28 to be on, and to be off while $I_a$ is positive (i.e., during the active periods). A similar switching of the IGBTs 24, 26, 30, 32 on the other two phases is also achieved by the gating signals generated by controller 46.

Figure 5:
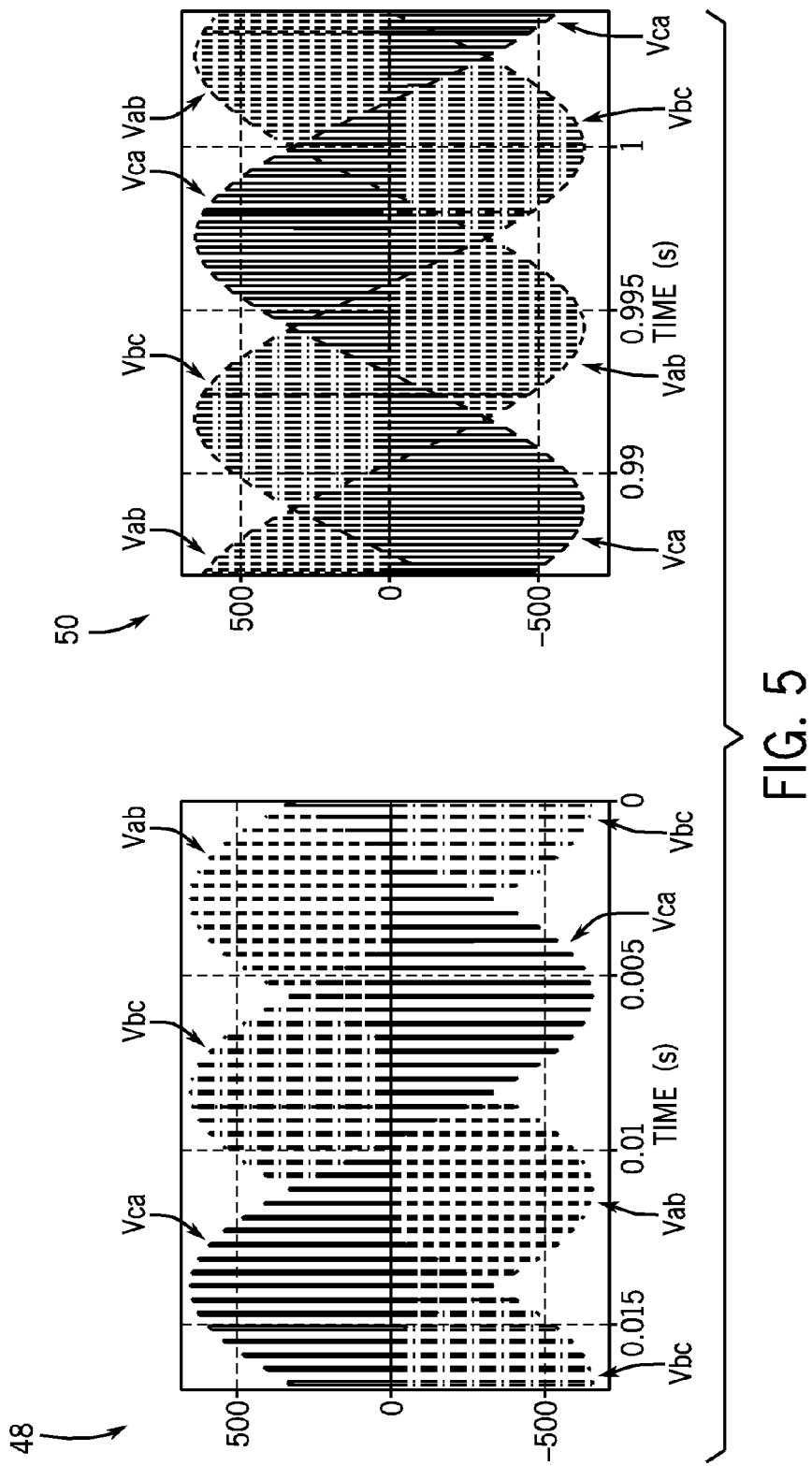
FIG. 5 is a diagram illustrating load terminal voltages at low and high duty cycles generated by the load control device of FIG. 1, according to an embodiment of the invention.

Referring now to FIG. 5, the load terminal voltages of AC load 10 are illustrated over approximately a line period (1 over 60 Hz), with a low duty cycle 48 and a high(er) duty cycle 50. What can be seen is that the voltages at the terminals 38 are very sinusoidal in shape, and that their magnitudes are lower on average than the line voltage, according to the duty cycle. In this example, the switching frequency is 14*3*60=2520 Hz. The choice of switching frequency is a trade-off between low harmonic content, on the one end, and higher switching losses, on the other hand. It may be noted that the switching frequency can be easily changed during a starting sequence, or from one start to another, in order to reduce harmonic content, or heat dissipation, at critical times, such that the trade-off in question can be dynamically changed during operation.

In FIGS. 4 and 5, waveforms are shown with duty cycles that are uniform within a cycle, that is, of a constant value from beginning to end of the supply period (e.g., one 60 Hz cycle/period). The user may opt, alternatively, to design a duty cycle that is shorter at the beginning and at the end of a period, and longer in the middle, or vice-versa. Generally, any pattern is possible within each period, and the use of non-constant patterns may be of advantage to reduce harmonics or for any other particular purpose.

According to an exemplary embodiment of the invention, the controller 46 is further configured and programmed to implement a switching control scheme that avoids current interruption during transition between the active period and the free-wheeling period, by instituting an "overlap" in switching times of the IGBTs 22, 24, 26, 28, 30, 32. This transition between the active period and the free-wheeling period is of importance, as the current to the AC load 10 ideally is not interrupted, as any interruption, even very short, would create a high di/dt and result in a destructively high voltage spike.

Figure 6:
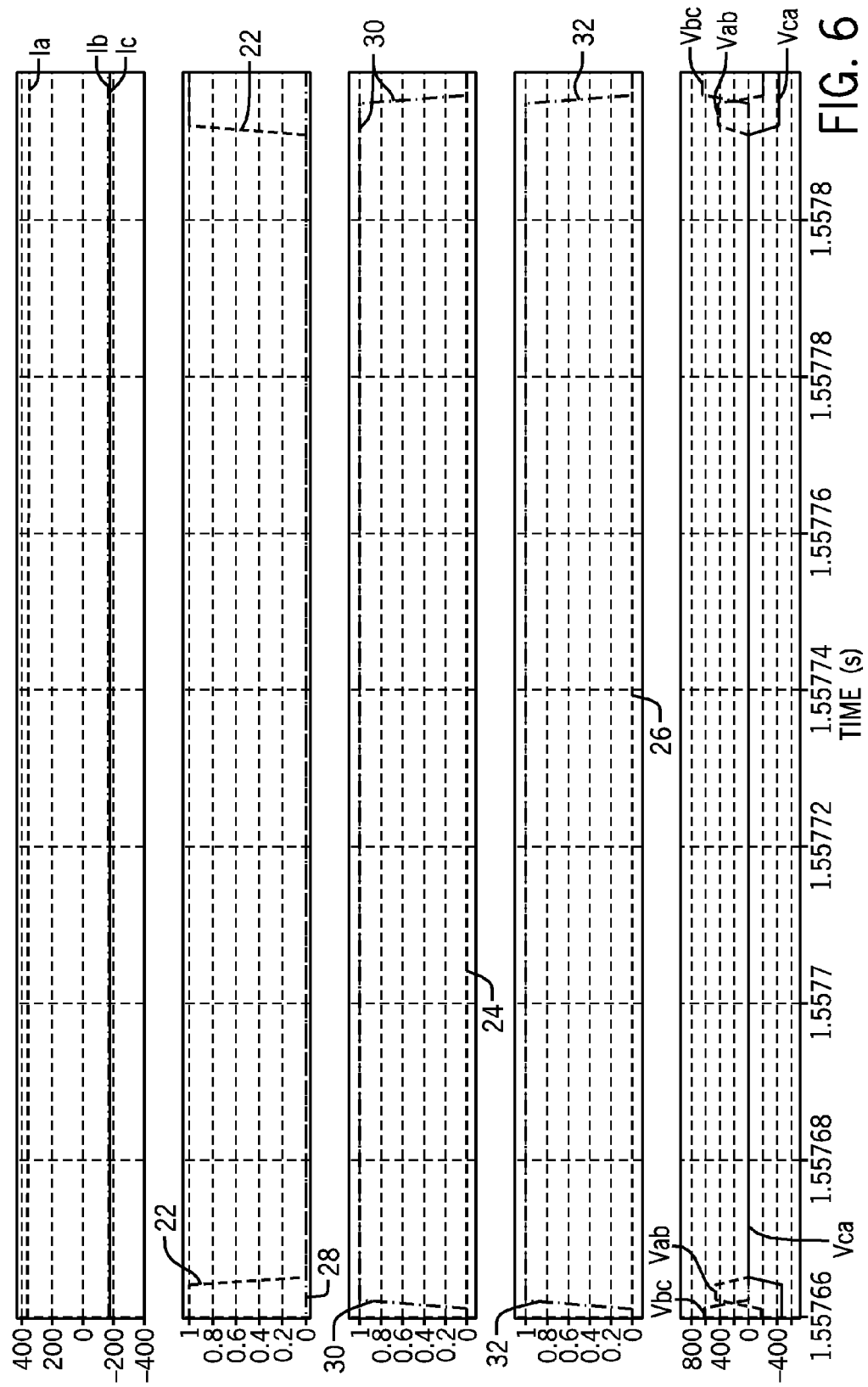
FIG. 6 is a diagram illustrating a switching logic for switching IGBTs in the motor control device in FIG. 1 when transitioning from an active mode of operation to a free-wheeling mode of operation, according to an embodiment of the invention

By way of example, the transition from the active period to the free-wheeling period in Case U of FIG. 2 (i.e., from Case U1 to U2) is achieved by turning IGBTs 30, 32 on before IGBT 22 is turned off, as is illustrated in FIG. 6. The length of the resulting overlap is not critical, as long as it is sufficiently long to prevent any current interruption. An overlap in the tenths of microseconds is typically sufficient, and longer overlaps, in the millisecond range, are acceptable as well.

The transition from positive to negative phase currents is also important (e.g., from Case U to Case V in FIG. 2, for example), as it is imperative to never have the line side IGBTs 22, 24, 26, and floating-neutral side IGBTs 28, 30, 32 on at the same time across any given phase, as this would short-circuit that phase. In any given phase, when the current goes from positive to negative, the controlling IGBT determining the active mode is the line side IGBT (when the current is positive), then the floating-neutral side IGBT (when the current is negative). Proper precautions are therefore implemented by the controller 46, such as filtering the current signal so that noise does not make the current signal cross zero numerous times and including a hysteresis band during which neither the line-side nor the floating-neutral side IGBT is turned on, when the absolute value of the current is below a certain threshold.

As indicated above, according to an exemplary embodiment of the invention, motor control device 20 is configured as a soft-starter that functions to reduce the inrush current into AC load 10 during starts. The soft-starter 20 functions to reduce the inrush current into AC load 10 during start-up by controlling a magnitude of the duty cycle—that is, the ratio of operating the soft-starter 20 in the active period over the sum of the active period and the free-wheeling period, as determined by the operational status of the IGBTs 22, 24, 26, 28, 30, 32 as controlled by controller 46. According to one embodiment of the invention, in starting the AC load 10, controller 46 functions to start the duty cycle magnitude from a low (but non-zero) magnitude, with the duty cycle being varied with time until it reaches 100%. This varying of the duty cycle will have the effect of exciting the load with a voltage varying from a low level to full voltage. According to another embodiment of the invention, in starting the load 10, controller 46 functions to start the duty cycle magnitude from a relatively high magnitude, for a short time, and then lower the duty cycle, with the duty cycle then being varied linearly with time until it reaches 100%. This starting of the AC load 10 initially at a relatively high duty cycle magnitude gives the system a kick start of short duration. In general, the higher the duty cycle, the higher the voltage at the load terminals 38, up to line voltage for 100% duty cycle. It will be appreciated that the duty cycle may be constant within any line-voltage period, or vary according to any predetermined pattern. The duty cycle control can also be a function of time during which the torque is changed in a desired manner during the soft starting.

According to additional embodiments of the invention, it is recognized that the structure of soft-starter 20 can be varied while still being considered to be within the scope of the invention. For example, differing embodiments of the invention can be achieved by varying the connection and/or arrangement of the IGBTs 22, 24, 26, 28, 30, 32 in the soft-starter 20 from that which is shown in FIG. 1. For example, soft-starters may be provided where the three line-side IGBTs 22, 24, 26, are reversed, where the three floating-neutral side IGBTs 28, 30, 32 are reversed, or where all six IGBTs 22, 24, 26, 28, 30, 32 are reversed, from what is shown in FIG. 1.

Beneficially, the control scheme for switching IGBTs 22, 24, 26, 28, 30, 32 that is implemented by the controller 46 is such that the current in the AC load 10 is never interrupted. Additionally, it will be appreciated that the switching of the IGBTs 22, 24, 26, 28, 30, 32 is governed, at least in part, by the line frequency (50/60 Hz). The switching logic implemented by the system and method of the present invention is thus different from other AC chopper and drive designs and beneficially enables more control of the load than with prior art soft starters, while avoiding the need for expensive passive components.

Figure 7:
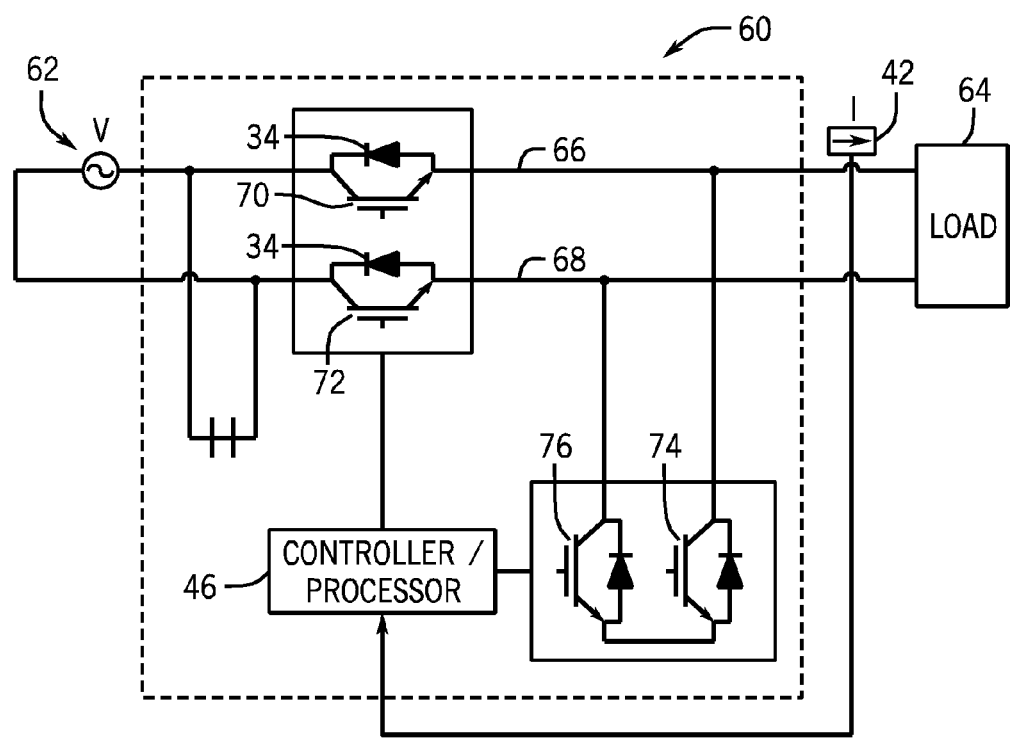
FIG. 7 is a schematic view of a load control device for controlling a single phase AC current to an AC load in a controlled fashion, according to an embodiment of the invention.

Referring now to FIG. 7, according to another embodiment of the invention, a motor control device 60 is shown for use with a single-phase system, where a single phase AC power source 62 is employed for providing power to an AC load 64. A single supply line 66 connects the input and output of the control device 60 to transmit power from the AC source 62 to the AC load 64 with a return line 68 also being included in the single phase system. The motor control device 60 includes a plurality of switches 70, 72, 74, 76 (e.g., IGBTs) connected to the supply and return lines 66, 68, with each of the switches coupled in anti-parallel with a diode 78 so as to control the current flow and, in turn, the terminal voltages of the AC load 64. Two IGBTs 70, 72 are "line-side IGBTs" that are connected between the terminals of AC source 62 and the terminals of the AC load 64, with a line-side IGBT on each of the supply and return lines 66, 68. The two other IGBTs 72, 74 are "floating-neutral side IGBTs" that are connected to the terminals of the AC load 64 at one end and together at a common connection 80 at the other end, with a floating-neutral side IGBT on each of the supply and return lines 66, 68.

Similar to the a motor control device 20 shown in FIG. 1, the motor control device 60 in FIG. 7 also includes a controller or processor 46 configured to control operation of IGBTs 70, 72, 74, 76 via the transmission of gate drive signals thereto. During start-up (or stopping/braking) of AC load 64, controller 46 functions to selectively cause each of IGBTs 70, 72, 74, 76 to operate in an On or Off condition, so as to control the current flow (and therefore the voltage) applied to the AC load 64. According to embodiments of the invention, controller 46 is configured and programmed to implement a switching pattern control scheme that provides for full control of the currents provided to AC load 64 on supply line 66, while providing for the current in the load inductances to never be interrupted.

A technical contribution for the disclosed method and apparatus is that it provides for a computer implemented technique for providing continuous current to an AC load during start-up thereof, as opposed to a discontinuous current as in chopper controlled and some SCR controlled motor controllers. The technique controls switching of a plurality of IGBTs in a motor control device to limit the transient voltages and current to the AC load during start-up by controlling a magnitude of the duty cycle of the device, and further controls switching of a plurality of IGBTs such that the current in the AC load is never interrupted.

Therefore, according to one embodiment of the present invention, a load control device to control current flow to an AC load includes a circuit having an input connectable to a line terminal of an AC source, an output connectable to a load terminal of an AC load, one or more supply lines connecting the input and output to transmit power from the AC source to the AC load with each supply line corresponding to a phase in the AC load, a plurality of line-side switches connected between the line terminal and the load terminal with each supply line including at least one line-side switch connected thereto, and a plurality of floating-neutral side switches connected to the load terminal at one end and together at a common connection at another end with each supply line including at least one floating-neutral side switch connected thereto. The load control device also includes a controller connected to the circuit and configured to determine a direction of current flow on each of the supply lines, determine a switching pattern for each of the plurality of line-side switches and each of the plurality of floating-neutral side switches based on the determined direction of current flow on each of the supply lines, and cause each of the plurality of line-side switches and each of the plurality of floating-neutral side switches to operate in either an On condition or an Off condition according to the determined switching pattern, such that a controlled uninterrupted current flow is provided to the AC load.

According to another embodiment of present invention, a control device for controlling application of voltage and supply of current from an AC power source to an AC load includes one or more supply lines connecting line terminals of the AC power source to load terminals of the AC load, with each supply line corresponding to a phase in the AC load. The control device also includes a plurality of switches selectively switchable between an On condition and an Off condition to control transmission of voltage and current from an AC power source to an AC load, with the plurality of switches further including a group of line-side switches connected to the supply lines between the line terminals and the load terminals such that each supply line includes at least one line-side switch connected thereto and a group of floating-neutral side switches connected to the supply lines at one end and together at a common connection at another end such that each supply line includes at least one floating-neutral side switch connected thereto. The control device further includes a processor programmed to identify a current on each of the supply lines as a positive current or negative current, determine a switching pattern for each of the line-side switches and each of the floating-neutral side switches based on the identified positive and negative currents, and selectively operate each of the line-side switches and each of the floating-neutral side switches in the On condition or the Off condition according to the determined switching pattern, wherein switching the plurality of switches according to the determined switching pattern provides for an uninterrupted current flow to the AC load during switching of the plurality of switches.

According to yet another embodiment of the present invention, a method for controlling current flow to an AC load includes the step of providing a circuit in series between an AC power source and the AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end. The method also includes the step of selectively operating the circuit in an active mode and a free-wheeling mode so as to selectively provide a full phase voltage to the load terminals during the active mode and a zero voltage to the load terminals during the free-wheeling mode of operation, wherein the step of operating the circuit further comprises identifying a current on each of the one or more supply lines as a positive current or negative current, determining a switching pattern with a defined frequency and a duty cycle for each of the line-side switches and each of the floating-neutral side switches based on the identified positive and negative currents, and selectively operating each of the plurality of line-side switches and each of the plurality of floating-neutral side switches in the On condition or the Off condition according to the determined switching pattern, wherein switching the plurality of switches according to the determined switching pattern provides for a continuous current flow to the AC load during switching of the plurality of switches.

The present invention has been described in terms of the preferred embodiment, and it is recognized that equivalents, alternatives, and modifications, aside from those expressly stated, are possible and within the scope of the appending claims.

What is claimed is:

1. A load control device to control current flow to an AC load, the load control device comprising:
   a circuit including:
      an input connectable to a line terminal of an AC source;
      an output connectable to a load terminal of an AC load;
      one or more supply lines connecting the input and output to transmit power from the AC source to the AC load, each supply line corresponding to a phase in the AC load;
      a plurality of line-side switches connected between the line terminal and the load terminal, such that each supply line includes at least one line-side switch connected thereto; and
      a plurality of floating-neutral side switches connected to the load terminal at one end and together at a common connection at another end, such that each supply line includes at least one floating-neutral side switch connected thereto, the common connection comprising a floating neutral point that is distinct from a load neutral and a source neutral; and
   a controller connected to the circuit and configured to:
      determine a direction of current flow on each of the supply lines;
      determine a switching pattern for each of the plurality of line-side switches and each of the plurality of floating-neutral side switches based on the determined direction of current flow on each of the supply lines; and
      cause each of the plurality of line-side switches and each of the plurality of floating-neutral side switches to operate in either an On condition or an Off condition according to the determined switching pattern, such that a controlled uninterrupted current flow is provided to the AC load;
   wherein, in operating the circuit in an active mode, the controller is further configured to:
      cause the line-side switches on supply lines having a positive current to operate in the On condition;
      cause the line-side switches on supply lines having a negative current to operate in the Off condition; and
      cause each of the plurality of floating-neutral side switches to operate in the Off condition; and
   wherein, in operating the circuit in a free-wheeling mode, the controller is further configured to:
      cause the floating-neutral side switches on supply lines having a negative current to operate in the On condition;
      cause the floating-neutral side switches on supply lines having a positive current to operate in the Off condition; and
      cause each of the plurality of line-side switches to operate in the Off condition.

2. The load control device of claim 1 wherein the AC load comprises a single phase load and the one or more supply lines comprises one supply line for transmitting power from the AC source to the AC load, and wherein a return line is further attached to the single phase load.

3. The load control device of claim 2 wherein the plurality of line-side switches comprises two line-side switches, with one line-side switch connected to the supply line and one line-side switch connected to the return line; and
   wherein the plurality of floating-neutral side switches comprises two floating-neutral side switches, with one floating-neutral side switch connected to the supply line and one floating-neutral side switch connected to the return line.

4. The load control device of claim 1 wherein the AC load comprises a multi-phase load with a supply line corresponding to each phase, and wherein the plurality of line-side switches comprises one line-side switch per phase and the plurality of floating-neutral side switches comprises one floating-neutral side switch per phase.

5. The load control device of claim 1 wherein, in determining the switching pattern for each of the plurality of line-side switches and each of the plurality of floating-neutral side switches, the controller is further configured to:
   determine a switching pattern that causes a full phase voltage to be provided to the load terminals during the active mode of the circuit; and
   determine a switching pattern that causes a zero voltage to be provided to the load terminals during the free-wheeling mode of the circuit.

6. The load control device of claim 5 wherein the controller is further configured to determine a period of operation for the circuit in each of the active mode and the free-wheeling mode based on a desired duty cycle of the load control device.

7. The load control device of claim 6 wherein the controller is configured to adjust a magnitude of the duty cycle so as to control an average voltage to be applied to the AC load.

8. The load control device of claim 6 wherein the controller is configured to adjust the magnitude of the duty cycle within each supply period so as to control the current waveform.

9. The load control device of claim 5 wherein the controller is configured to control switching of each of the plurality of line-side switches and each of the plurality of floating-neutral side switches during transition from the active mode to the free-wheeling mode, such that an uninterrupted current flow is provided to the AC load.

10. The load control device of claim 9 wherein, in transitioning from the active mode to the free-wheeling mode, the controller is configured to turn on each of the plurality of floating-neutral side switches that are to be operated in the On condition during the free-wheeling mode before turning Off the line-side switches that were operated in the On condition during the active mode.

11. The load control device of claim 1 wherein the plurality of line-side switches and the plurality of floating-neutral side switches comprises a plurality of insulated gate bipolar transistors (IGBTs).

12. The load control device of claim 1 wherein the controller is configured to control switching of each of the plurality of line-side switches and each of the plurality of floating-neutral side switches between the On condition and the Off condition according to a pre-determined switching frequency, with the switching frequency being a multiple of a product of the number of phases in the AC load and the power supply frequency.

13. The load control device of claim 1 wherein the controller is configured to prevent a floating-neutral side switch and a line-side switch on the same supply line from simultaneously being in the On condition when the respective supply line experiences a transition between from a positive current to a negative current.

14. The load control device of claim 1 wherein the circuit further comprises diodes positioned in an anti-parallel arrangement with each of the plurality of line-side switches and floating-neutral side switches.

15. The load control device of claim 1 wherein the circuit is configured to provide a capability for starting and stopping the AC load in a controlled fashion.

16. A control device to control application of voltage and supply of current from an AC power source to an AC load, the control device comprising:
  one or more supply lines connecting line terminals of the AC power source to load terminals of the AC load, each supply line corresponding to a phase in the AC load;
  a plurality of switches selectively switchable between an On condition and an Off condition to control transmission of voltage and current from an AC power source to an AC load, the plurality of switches including:
    a group of line-side switches connected to the supply lines between the line terminals and the load terminals, such that each supply line includes at least one line-side switch connected thereto; and
    a group of floating-neutral side switches connected to the supply lines at one end and together at a common connection at another end, such that each supply line includes at least one floating-neutral side switch connected thereto, the common connection comprising a floating neutral point that is distinct from a load neutral and a source neutral; and
  a processor programmed to:
    identify a current on each of the supply lines as a positive current or negative current;
    determine a switching pattern for each of the line-side switches and each of the floating-neutral side switches based on the identified positive and negative currents; and
    selectively operate each of the line-side switches and each of the floating-neutral side switches in the On condition or the Off condition according to the determined switching pattern;
    wherein switching the plurality of switches according to the determined switching pattern provides for an uninterrupted current flow to the AC load during switching of the plurality of switches
  wherein, in operating the control device in the active mode, the processor is programmed to:
    cause the line-side switches on supply lines having a positive current to operate in the On condition;
    cause the line-side switches on supply lines having a negative current to operate in the Off condition; and
    cause each of the plurality of floating-neutral side switches to operate in the Off condition; and
  wherein, in operating the control device in the free-wheeling mode, the processor is programmed to:
    cause the floating-neutral side switches on supply lines having a negative current to operate in the On condition;
    cause the floating-neutral side switches on supply lines having a positive current to operate in the Off condition; and
    cause each of the plurality of line-side switches to operate in the Off condition.

17. The control device of claim 16 wherein the processor is further programmed to selectively operate each of the plurality of line-side switches and each of the plurality of floating-neutral side switches in the On condition or the Off condition to operate the control device in one of an active mode and a free-wheeling mode;
  wherein a full phase voltage is provided to the load terminals during the active mode and a zero voltage is provided to the load terminals during a free-wheeling mode of AC load operation.

18. The control device of claim 16 wherein the processor is programmed to control switching of each of the line-side switches and each of the floating-neutral side switches during transition from the active mode to the free-wheeling mode, with the processor being programmed to turn on each of the plurality of floating-neutral side switches that are to be operated in the On condition during the free-wheeling mode before turning Off the line-side IGBTs that were operated in the On condition during the active mode.

19. A method for controlling current flow to an AC load comprising:
  providing a circuit in series between an AC power source and the AC load, the circuit comprising a plurality of switches forming a group of line-side switches connected to one or more supply lines between the line terminals of the AC power source and load terminals of the AC load and a group of floating-neutral side switches connected to the one or more supply lines at one end and together at a common connection at another end, the common connection comprising a floating neutral point that is distinct from a load neutral and a source neutral;
  selectively operating the circuit in an active mode and a free-wheeling mode so as to selectively provide a full phase voltage to the load terminals during the active mode and a zero voltage to the load terminals during the free-wheeling mode of operation, wherein operating the circuit comprises:
    identifying a current on each of the one or more supply lines as a positive current or negative current;
    determining a switching pattern with a defined frequency and a duty cycle for each of the line-side switches and each of the floating-neutral side switches based on the identified positive and negative currents; and
    selectively operating each of the plurality of line-side switches and each of the plurality of floating-neutral side switches in the On condition or the Off condition according to the determined switching pattern;
    wherein switching the plurality of switches according to the determined switching pattern provides for a continuous current flow to the AC load during switching of the plurality of switches;
  wherein operating the circuit in the active mode comprises:
    causing the line-side switches on supply lines having a positive current to operate in the On condition;
    causing the line-side switches on supply lines having a negative current to operate in the Off condition; and
    causing each of the plurality of floating-neutral side switches to operate in the Off condition; and wherein operating the circuit in the free-wheeling mode comprises:
  causing the floating-neutral side switches on supply lines having a negative current to operate in the On condition;
  causing the floating-neutral side switches on supply lines having a positive current to operate in the Off condition; and
  causing each of the plurality of line-side switches to operate in the Off condition.

* * * * *